US007264104B2

(12) United States Patent
Heeszel et al.

(10) Patent No.: US 7,264,104 B2
(45) Date of Patent: Sep. 4, 2007

(54) CRUSHER IN-FEED CONVEYOR METHOD AND APPARATUS

(75) Inventors: Gary Heeszel, Eugene, OR (US); Tom Furrer, Eugene, OR (US); Robert Carnes, Eugene, OR (US)

(73) Assignee: Johnson Crushers International, Eugene, OR (US)

( * ) Notice: Subject to any disclaimer, the term of this patent is extended or adjusted under 35 U.S.C. 154(b) by 33 days.

(21) Appl. No.: 11/078,684

(22) Filed: Mar. 11, 2005

(65) Prior Publication Data

US 2006/0202073 A1 Sep. 14, 2006

(51) Int. Cl.
*B65G 21/10* (2006.01)

(52) U.S. Cl. .................. 198/317; 198/318; 198/316.1; 198/314

(58) Field of Classification Search ................ 198/315, 198/316.1, 317, 318, 314
See application file for complete search history.

(56) References Cited

U.S. PATENT DOCUMENTS

| | | | | |
|---|---|---|---|---|
| 2,575,729 | A * | 11/1951 | Radakovich | 198/304 |
| 2,642,982 | A * | 6/1953 | Andershock | 198/316.1 |
| 3,987,890 | A * | 10/1976 | Merritt | 198/316.1 |
| 4,089,403 | A * | 5/1978 | Freed et al. | 198/316.1 |
| 4,524,916 | A | 6/1985 | Keyes | |
| 5,025,992 | A | 6/1991 | Niebur | |
| 5,161,744 | A | 11/1992 | Schoop | |
| 5,251,832 | A | 10/1993 | Hentschel | |
| 5,294,065 | A | 3/1994 | Harms | |
| 5,316,431 | A * | 5/1994 | Barber | 414/523 |
| 5,664,907 | A | 9/1997 | Betsinger | |
| 5,819,950 | A * | 10/1998 | McCloskey | 209/241 |
| 6,032,886 | A | 3/2000 | Drinkwater | |
| 6,575,303 | B1 | 6/2003 | Brock | |
| 6,581,780 | B1 | 6/2003 | Jakob | |
| 6,662,939 | B1 * | 12/2003 | McCusker et al. | 198/861.1 |
| 6,935,587 | B2 | 8/2005 | Brock | |
| 2003/0226919 | A1 | 12/2003 | Brock | |

FOREIGN PATENT DOCUMENTS

WO WO 2004/096677 A1 11/2004

* cited by examiner

*Primary Examiner*—Mark A Deuble
(74) *Attorney, Agent, or Firm*—Schwabe, Williamson & Wyatt, P.C.

(57) ABSTRACT

An aggregate processing unit is provided that includes an in-feed conveyor adapted to have a first lower section that can move laterally to accommodate various processing configurations and to also allow for enhanced mobility.

19 Claims, 6 Drawing Sheets

CRUSHER IN-FEED CONVEYOR METHOD AND APPARATUS

FIELD OF THE INVENTION

Embodiments of the present invention relate to in-feed conveyors for rock and aggregate processing equipment, and particularly directed to crusher in-feed conveyors that may be adapted to move in order to enable the conveyor to adapt to different in-feed configurations, which in turn can allow for increased versatility and mobility of the processing equipment.

BACKGROUND

In-feed conveyors for rock and aggregate processing equipment, such as crushers, are typically configured to be in line, such that they transport material to be crushed from a first end of the crusher and deposit the material in the crusher for size reduction. The crushed material is then deposited on a discharge conveyor that extends out a second end of the crusher by way of a discharge conveyor. Where the crushers are adapted for mobile transport, such as being track mounted or wheel mounted, the discharge conveyor is typically located between the tracks or wheels and extends outward from the second side in a generally parallel manner with the tracks or wheels. Such in-line configurations may be appropriate for open circuit processing situations, but is not well suited for closed circuit processing operations.

Closed circuit processing operations may include situations where another piece of aggregate processing equipment, such as a screen unit, is in material communication with the crushing unit such that the screen plant feeds the crusher with its top deck-overs, which are deposited onto the in-line crusher feed conveyor. The crusher then crushes the material and deposits it on the discharge conveyor that conveys the material out the second end of the crusher. Through a series of conveyors, the discharge is then routed back to the screen plant for further processing. Because of the in-line configuration, one or more additional conveyors is required to be able to reroute the discharge from the discharge conveyor back to the screen in-feed conveyor. This is not only a cost increase for a closed circuit system, but it also requires additional processing equipment which can be cumbersome and require more time to setup and teardown the plant for moving purposes.

DETAILED DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The following description may include terms such as inner, outer, under, between, upward, downward, rearward, outward, inward, and the like, which are used for descriptive purposes only and are not to be construed as limiting. That is, these terms are terms that are relative only to a point of reference and are not meant to be interpreted as limitations but are, instead, included in the following description to facilitate understanding of the various aspects of the invention.

Embodiments of the present invention include a crusher in-feed conveyor adapted to direct a feed stream of material, typically rock and/or aggregate, to a crushing unit, and which may be configured to extend from a common side/end of the crusher as the crusher discharge conveyor. Further embodiments of the present invention include an in-feed conveyor that may be movably positioned in an inline configuration, or may be positioned in at least a right, left, and center processing configuration. In further embodiments of the present invention, the in-feed conveyor may be adapted to move laterally toward and away from a crusher centerline to enable the crusher to integrate with a variety of processing units, such as screen plants of various makes, models, and configurations, as well as to allow the crusher unit to better accommodate transport.

Embodiments of the present invention may be particularly suited for closed circuit processing as it can reduce the number of ancillary conveyors required to process material in a closed circuit operation. Embodiments of the present invention may also allow for open circuit in-line processing by way of a discharge conveyor being adapted to extend from the opposite end of the crusher as the in-feed conveyor.

Figure 2:
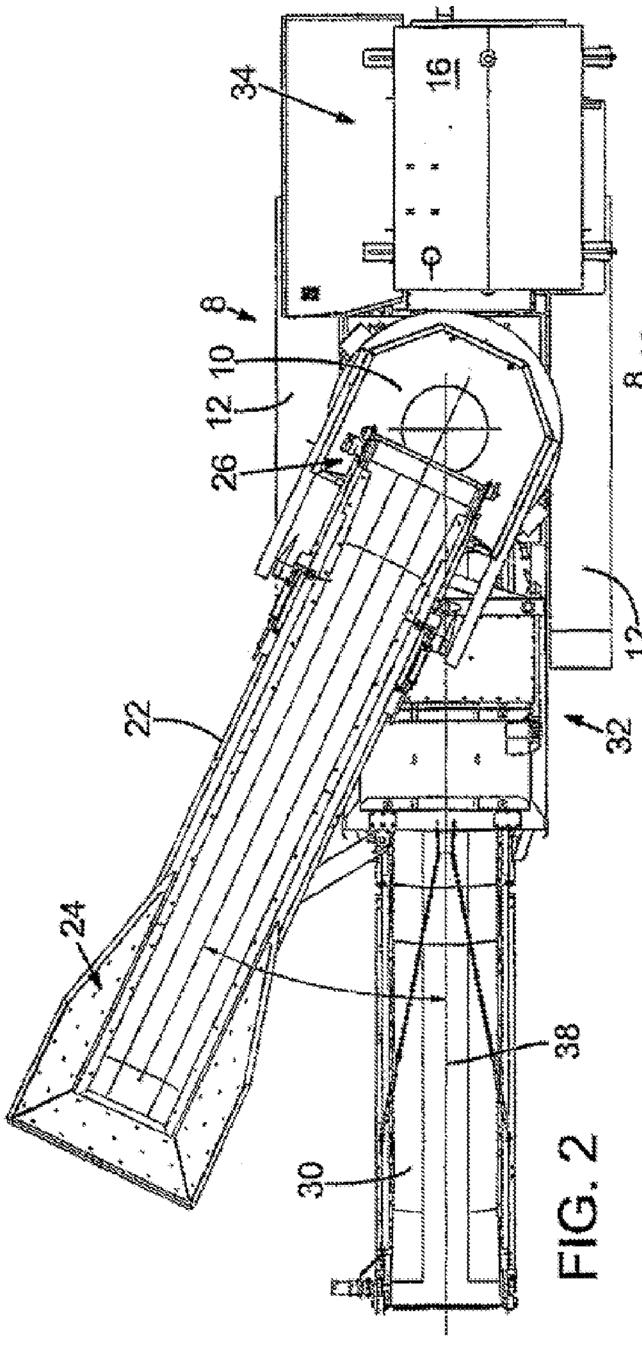
FIG. 2 illustrates a top view of a crusher unit in accordance with an embodiment of the present invention.
Figure 1:
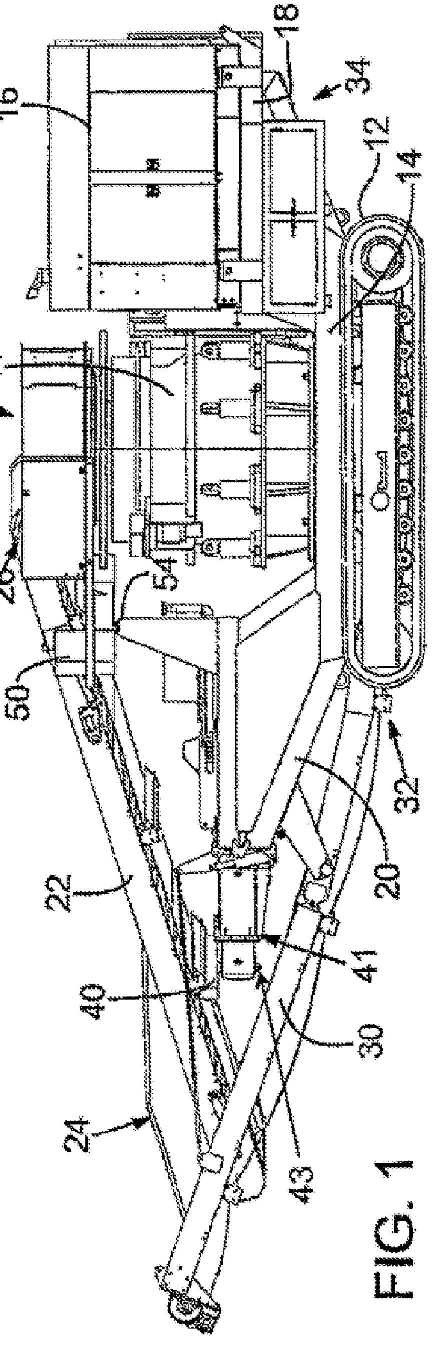
FIG. 1 illustrates a side view of a crusher unit in accordance with an embodiment of the present invention.

FIG. 1 illustrates a side view of a mobile crushing unit 8 in accordance with embodiments of the present invention. FIG. 2 illustrates a top view of the crushing unit 8 in accordance with embodiments of the present invention. A crusher 10, such as a cone crusher, may be coupled to tracks 12 by frame 14. Tracks 12 and crusher 10 may be powered by a power source 16. Power source 16 may be for example a diesel motor, electric motor or other drive source. In one embodiment, power source 16 may be coupled to a second end 34 of the crushing unit 8 via second end frame section 18. Frame 14 may also have first end frame section 20 extending from a first end 32 of the crushing unit 8.

In-feed conveyor 22 may be coupled to the rock crushing unit 8, and adapted to convey material from a tail section 24 to a head section 26, such that the material may be deposited into crusher 10 for size reducing. In-feed conveyor 22 may be coupled to the crushing unit 8 and supported at a lower half by first end frame section 20, and also supported at an upper half by first end frame section 20. A discharge conveyor 30 may be at least partially disposed underneath crusher 10 and supported by frame 14.

In one embodiment, a lower support 40 may be coupled to conveyor 22 and pivotally connected to retractable arm assembly 41. An upper support 50 may be coupled to conveyor 22 and pivotally an upper frame portion 54 of first end frame section 20. Retractable arm assembly 41 may be pivotally coupled to the first end frame section 20, such that when the arm assembly is extended, the conveyor 22 moves laterally away from the centerline 38, and when retracted, the conveyor 22 moves laterally toward the centerline 38.

In one embodiment in accordance with the present invention, discharge conveyor 30 may be configured to extend outwardly from the first end 32 of crushing unit 8 generally along centerline 38. In such a configuration, the in-feed conveyor 22 may be laterally positioned away from the centerline to ensure the in-feed conveyor 22 does not interfere with the operation of discharge conveyor 30. In other embodiments, discharge conveyor 30 may be adapted to extend outwardly from second end 34, generally along centerline 38. In such a case, in-feed conveyor 22 may extend from the first end 32 of crushing unit 8 in any processing configuration, including a center processing configuration. In either case, discharge conveyor 30 may be removably coupled to and partially supported by frame 14.

Figure 3A:
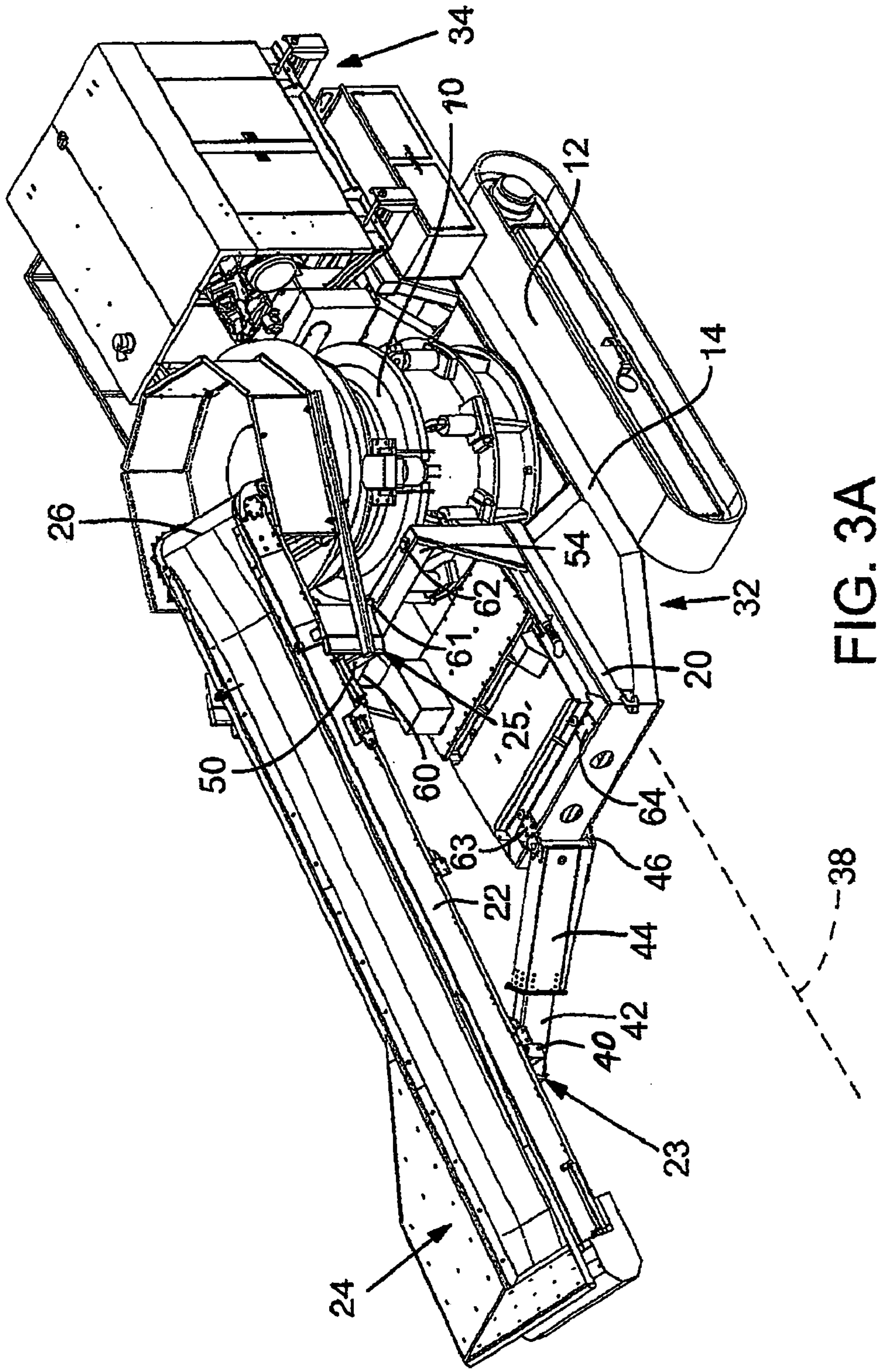
FIGS. 3A-3C illustrate front perspective views of a crusher unit in different crusher configurations in accordance with embodiments of the present invention.
Figure 3B:
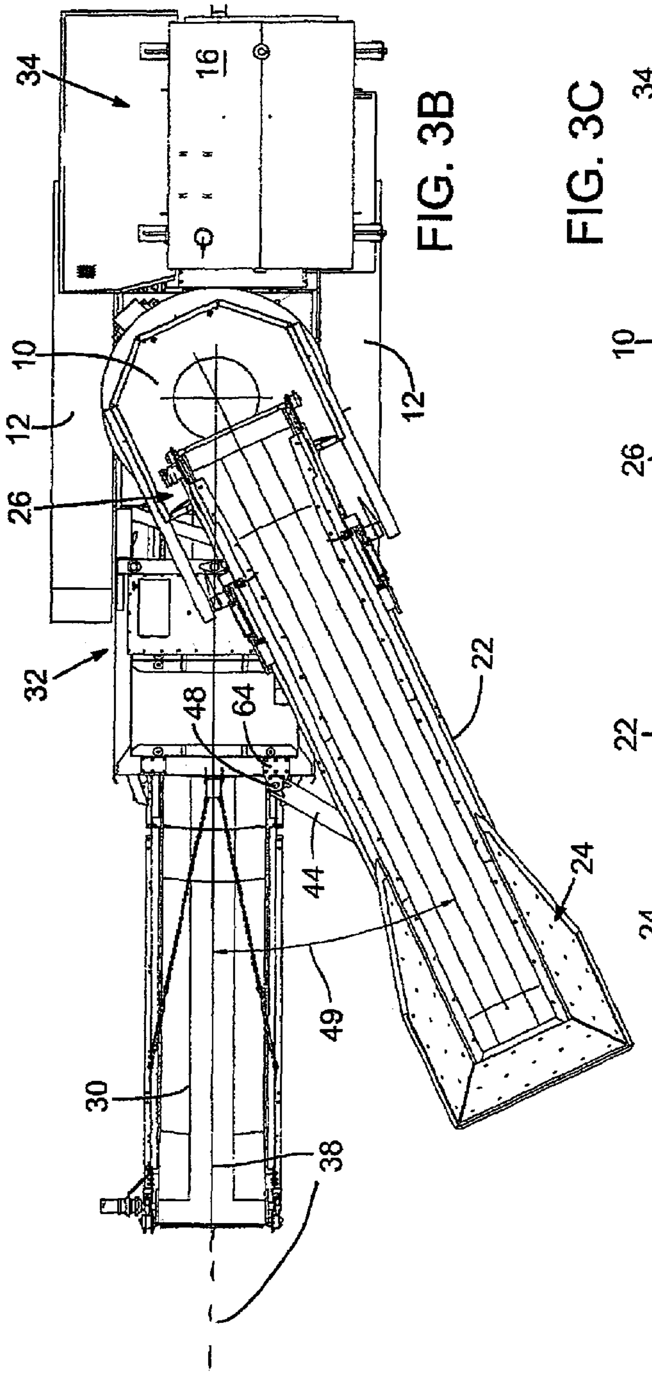
Figure 3C:
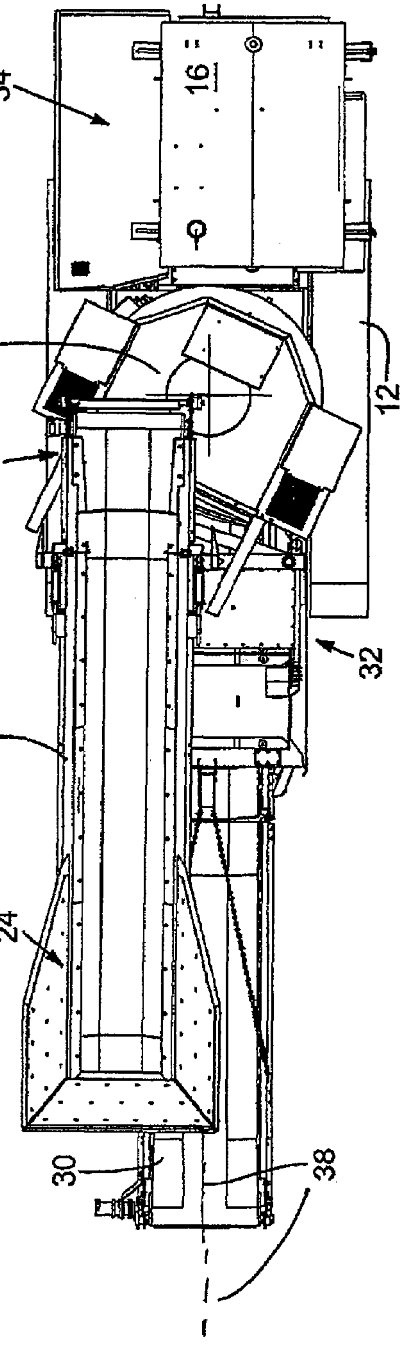

FIGS. 3A-3C illustrate front perspective views of a crushing unit 8 in accordance with embodiments of the present invention. For convenience, FIG. 3A is shown without a discharge conveyor. In-feed conveyor 22 may be positioned to move material from the tail section 24 to the head section 26, and deposit the material into crusher 10. Conveyor 22 may be movably supported by the first end frame section 20. In one embodiment the support is provided by at least two contact areas. A first contact area 23 may be made at a point more near the tail section 24, which may be at the lower half of the conveyor 22. A second contact area 25 may be made a point more near the head section 26, which may be at an upper half of the conveyor 22.

Lower support 40 may be coupled to conveyor 22 at the first contact area 23. Lower support 40 may be a yoke that is adapted to at least partially cradle the width of the conveyor 22 and provide support without interfering with the conveyor belt or other components. Lower support 40 may also be adapted to pivotally couple to telescoping arm 42, about a vertical pivot point. Telescoping arm 42 may be adapted to slide in and out of receiver 44. Receiver 44 may in turn be pivotally coupled to first end frame section 20 at a vertical pivot point 46. The pivotal connections between the lower support 40 and the telescoping arm 42, and in conjunction with the receiver 44 and the front frame potion 20, may allow the lower support 40 to pivot as the telescoping arm 42 is extended and retracted, in order to maintain coordinated alignment of the conveyor 22.

Upper support 50, which also may be a yoke, may be coupled to conveyor 22 at the second contact area 25. Upper support 50 may be adapted to pivotally couple an upper portion 54 of first end frame section 20. This pivotal connection allows the upper support 50 and thus the head section 26 to pivot while the tail section 24 moves laterally towards and away from the centerline 38. In one embodiment, the upper frame portion 54 may have three different receivers 60, 61, and 62 adapted to allow the upper support 50 to pivotally couple to the upper frame portion 54, which allows accommodation of right, center, and left-hand processing configurations respectively.

Likewise, there may be two or more receiver pivot points 46 and 48 by virtue of the receiver 44 being adapted to connect to the first end frame section 20 at right and left frame connection points 63 and 64. Thus, when in a right-hand processing configuration, the receiver 44 and frame pivot point 46 may be coupled to right-hand frame connection point 63, and the upper support 50 may be coupled to upper frame portion 54 at right-hand receiver 60, which is illustrated in FIG. 3A.

As illustrated in FIG. 3A, conveyor 22 may considered to be a right-hand configuration such that the conveyor 22 extends from the crushing unit first end 32 and is directed towards the right of centerline 38. This right-hand configuration allows a discharge conveyor (30 in FIGS. 1, 3B and 3C, for example) to also be extended outward from the first end 32 without interfering with the in-feed conveyor 22.

The pivotal coupling of the lower support 40 to telescoping arm 42, the pivotal coupling between receiver 44 and first end frame section 20 at receiver pivot point 46 and the generally fixed pivotal interconnection of upper support 50 to upper frame portion 54, allows for the tail section 24 of conveyor 22 to move laterally towards and away from the centerline 38 of the crushing unit 8. In one embodiment, the tail section 24 may be adapted to move up to 25 degrees off centerline 38. This ability to move laterally may allow for the in-feed conveyor 22 to be in material communication with different sized and differently configured processing units, such as screen units.

As illustrated in FIG. 3C, the ability to move laterally may also allow the in-feed conveyor 22 to be positioned substantially parallel to the centerline 38, which may facilitate transport of the crushing unit 8. In further embodiments, the pivotal interconnection of the upper and lower supports 40 and 50 may also allow for the in-feed crusher to swing from a right-hand configuration to a left-hand configuration to allow for quick process and configuration changes.

Conveyor 22 may be placed in a left-hand configuration, as illustrated in FIG. 3B, by coupling the upper support 50 (shown in FIG. 3A) with left-hand upper receiver 62 (shown in FIG. 3A) and by coupling receiver 44 to left-hand frame connection point 64, such that receiver 44 pivots about pivot point 48. As described with respect to the right-hand configuration, the conveyor 22 in the left-hand configuration may also move laterally relative to centerline 38, as indicated by direction arrows 49.

In-feed conveyor 22 may also be positioned in an in-line configuration parallel with centerline 38. To do so, upper support 50 may be coupled to the upper frame section 54 via center upper receiver 61. Receiver 44 may be coupled to first frame section 20 at either the right or left-hand frame connection points 63 or 64, such that receiver 44 pivots about either receiver pivot points 46 and 48. In one embodiment, the receiver 44 may also be coupled to a center frame connection point (not shown).

When moving from either the left-hand or right-hand configuration to the center configuration, the upper support will traverse a slightly curved or arcuate path, which is caused by the lateral movement of the tail section 24 of conveyor 22. To accommodate this arcuate path, in one embodiment, the upper support 50 may be configured to be reversible such it may be put in one position to accommodate alignment with right and left-hand upper receivers 60 and 62, but may also be turned around such that the upper support 50 is aligned with center upper receiver 61. In another embodiment in accordance with the present invention, upper frame portion 54 may be shaped to traverse a similar arcuate path, such that the center upper receiver 61 can accommodate pivotal coupling to upper support 50 without modification of the positioning or configuration of upper support 50.

Figure 4:
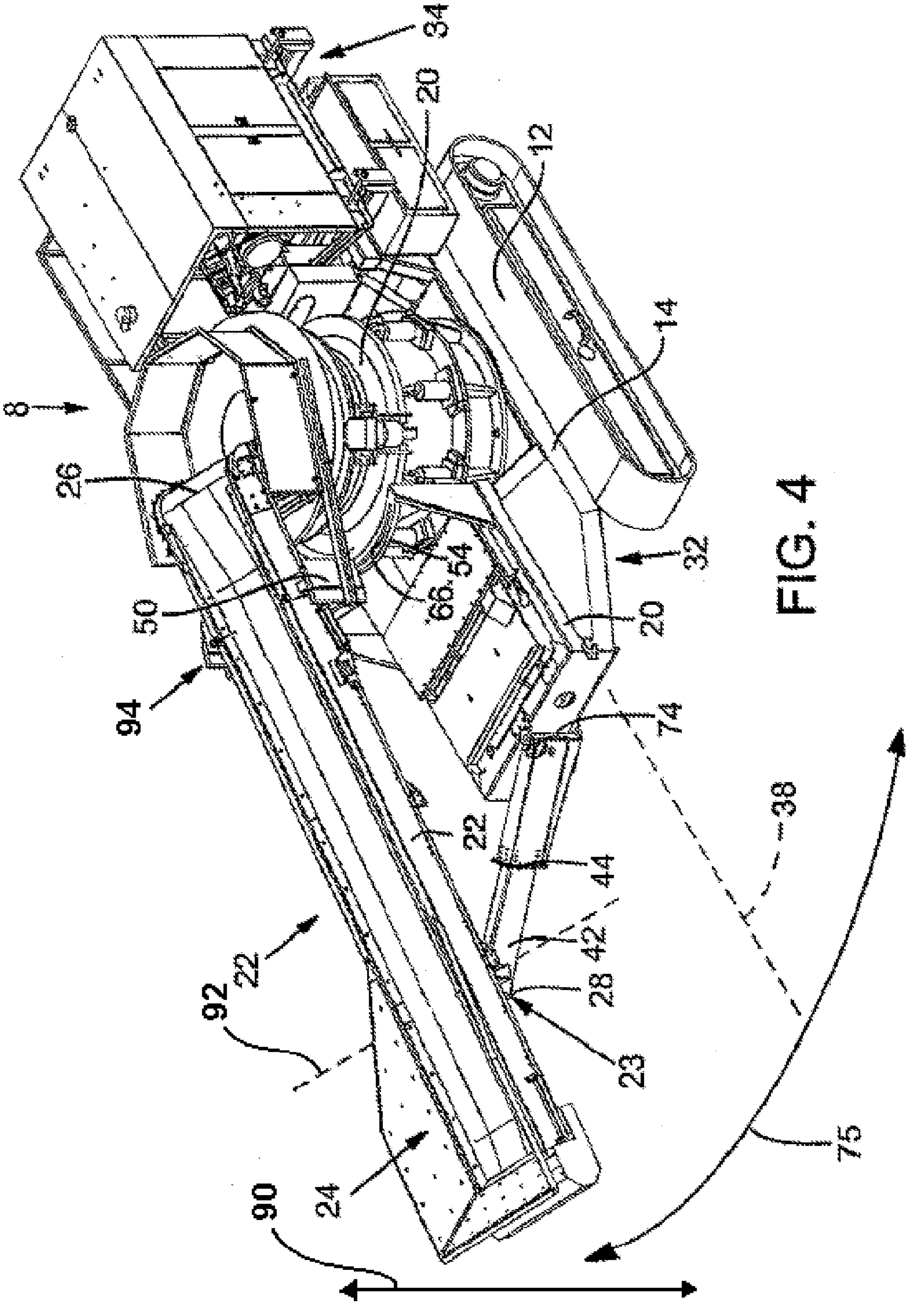
FIG. 4 illustrates a front perspective view of a crusher unit in accordance with an embodiment of the present invention.

FIG. 4 illustrates a front perspective view of an in-feed conveyor in accordance with an embodiment of the present invention. Upper support 50 of conveyor 22 may be pivotally and movably coupled to a floating pivot receiver 66 on upper frame portion 54. Lower support 40 may be coupled to telescoping arm 42 and receiver 44, such that the receiver is pivotally coupled to first end frame section 20 at center frame pivot point 74. So configured, the tail section 24 of conveyor 22 may laterally move between a right-hand configuration and a left-hand configuration, including operation in a center configuration, as indicated by arrow 75.

The floating pivot receiver 66 may be configured to allow upper support 50 to traverse the arc of upper frame portion 54 as the lower support is moved laterally from one side to the other. The floating pivot receiver 66 may thus allow for the head section 26 of the conveyor 22 to maintain a desired discharge position with respect to the top of the crusher 10 while the tail section 24 moves laterally. The floating pivot receiver 66 may be, for example, a groove, guide, track, or other configuration that may allow the upper support 50 to traverse the arcuate path of upper frame portion 54. In one embodiment, the upper support 50 or the floating pivot receiver 66 may also include a releasable locking mechanism configured to lock the upper support 50 at a desired position, and release the same when the tail section 24 of the conveyor is to be moved.

In one embodiment, the interconnection between the lower support 40 and the telescoping arm 42 may be also adapted to allow vertical movement of the tail section 24 as indicated by arrow 90. This may allow for additional adjustments to be made to accommodate different material processing units and conveyors. Such vertical movement may be caused by any one of a number of actuation devices, including, but not limited to hydraulic cylinders 43, linear motors, motors with rack and pinion coupling, manual activation, and the like. To accommodate such vertical movement of the tail section 24, both the lower and upper supports 40 and 50 may be pivotally coupled to the conveyor 22 about generally horizontal pivot points 94 and 96 (96 found in FIG. 6A). Such horizontal pivot points may pivot about an axis illustrated by line 92.

Figure 5:
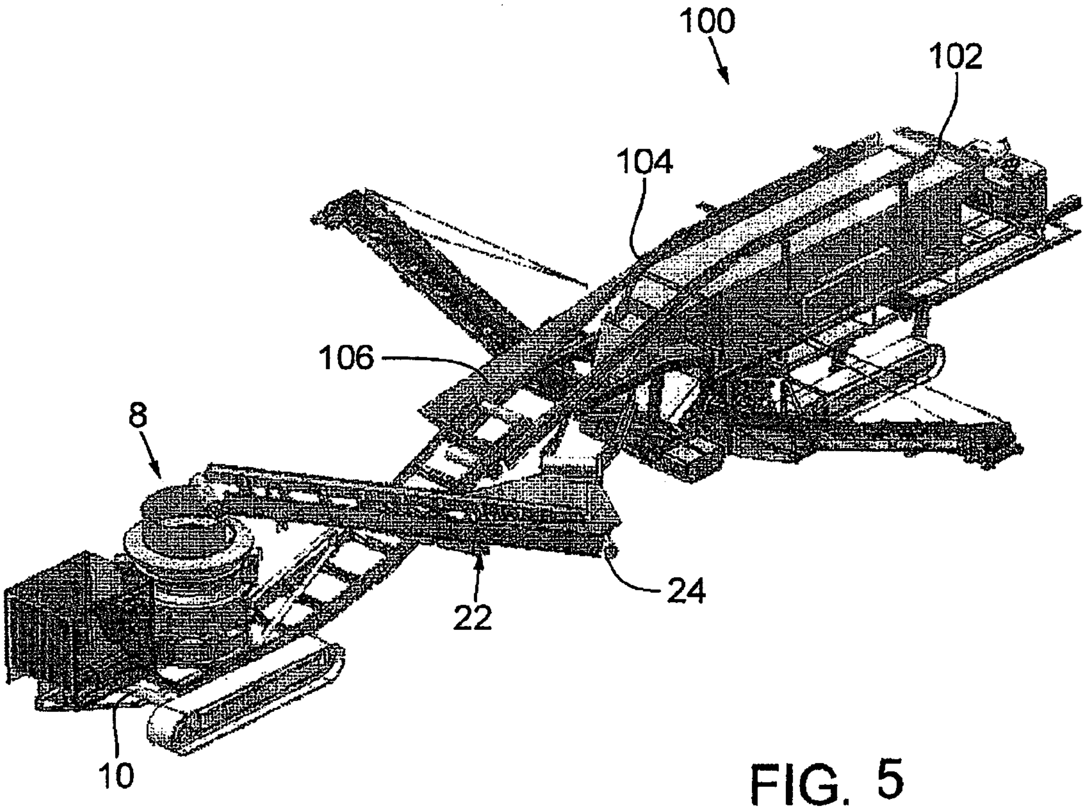
FIG. 5 illustrates a perspective view of a closed circuit mobile processing plant in accordance with an embodiment of the present invention.

FIG. 5 illustrates a closed circuit material processing unit in accordance with embodiments of the present invention. A mobile crushing unit 8 in accordance with embodiments of the present invention may be in material communication with a screen unit 100. Screen unit 100 may be adapted to receive material at a first end 102 and size sort the material as the material traverses the length of the screen towards a second end 104. The material that remains on the upper deck of the screen (i.e. top deck-overs) may be diverted to the tail section 24 of crusher in-feed conveyor 22 that extends from a first end of crushing unit 8.

The material may be conveyed to the head section 26 and deposited into crusher 10 for size reduction. The processed material may be deposited onto discharge conveyor 30, which may be positioned below crusher 10 and extend generally outward and upward from first end 32. The discharge conveyor 30 may be in material communication with a screen feed conveyor 106 configured to convey the material back to screen first end 102 for size sorting. As shown, the in-feed conveyor is in a right-hand configuration, such that the in-feed conveyor does not interfere with the discharge conveyor.

Figures 6A, 6B:
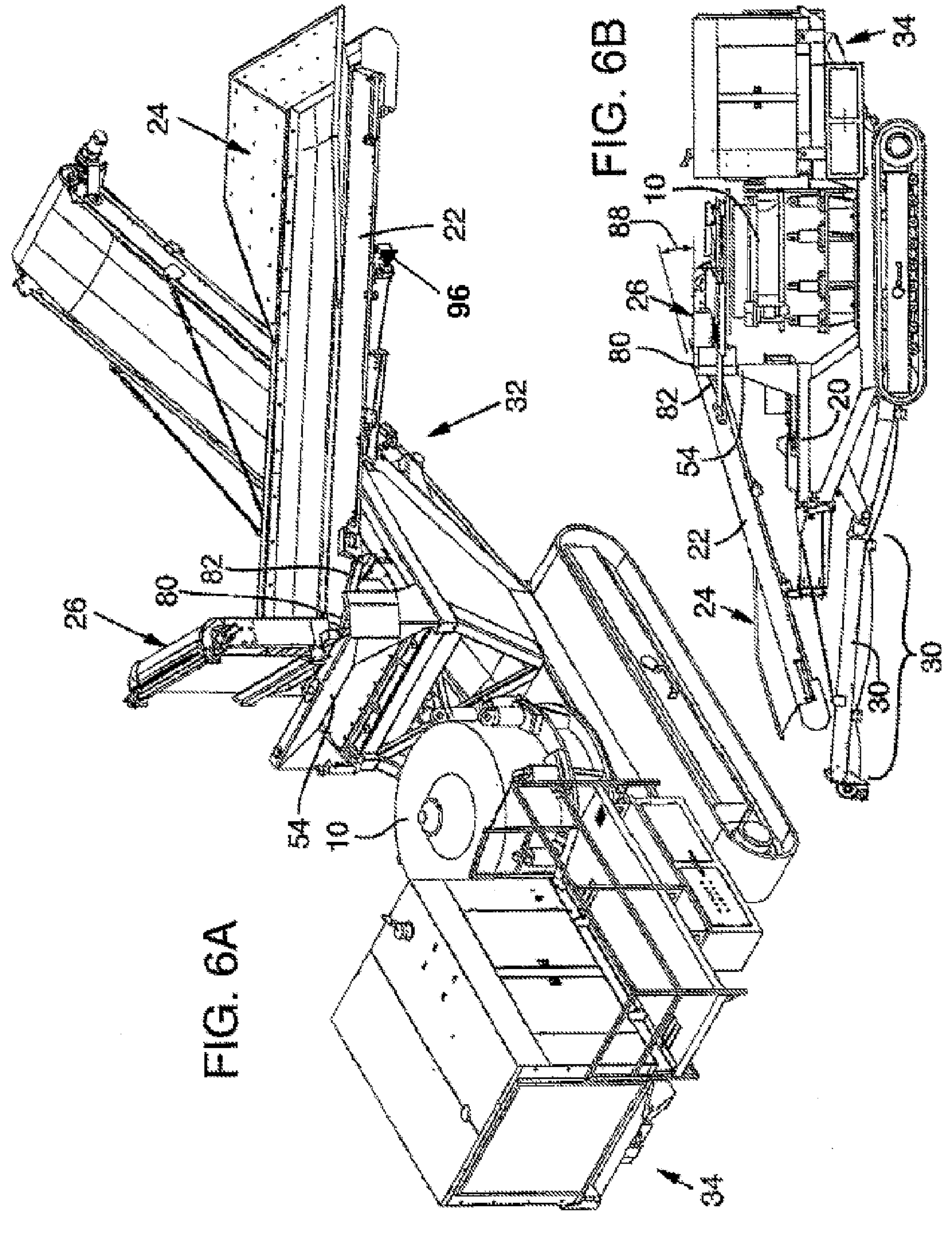
FIGS. 6A-6B illustrate perspective views of a crusher unit in accordance with an embodiment of the present invention.

FIGS. 6A and 6B illustrate a crusher in-feed conveyor in accordance with embodiments of the present invention. The head section 26 of a conveyor 22 may be pivotally coupled to conveyor 22 at a horizontal hinge point 80. Such a coupling can allow the head section 26 to be pivoted upwardly about horizontal hinge point 80, as shown in FIG. 6A. Such upward pivoting may better allow for crusher maintenance, such as replacement of a mantel, liner, or other work. As shown, the upper portion of crusher 10 has been removed, without the need to remove the entire in-feed conveyor 22.

The pivotal connection at hinge point 80 may also be adapted such that the head section 26 may pivot downward from its discharge position to a substantially horizontal position, as shown in FIG. 6B by arrows 88. Such a downward movement can allow the crushing unit 8 to fit within certain height restrictions, for example, when the crusher is to be transported to a different site. In one embodiment, the head section 26 in the folded down configuration renders the overall height of the crushing unit 8 less than 12 feet. Likewise, to further configure the crushing unit 8 for transport, discharge conveyor 30 may be jointed such that an outer portion 31 may be lowered to avoid interference with the tail section 24 of conveyor 22 as it moves laterally inward toward the crusher centerline (not shown).

As with all of the actuation of the various conveyor sections about the various pivot points disclosed with respect to various embodiments of the present invention, the upward and downward pivoting movement of the head section may be controlled by an extension and retraction of hydraulic cylinders 82. It can be appreciated, however, that other actuation mechanisms may be used. Further, an in-feed conveyor in accordance with the present invention may be used with other processing units, such as screens. It can also be appreciated that more points of connection may be used in conjunction with the upper and lower supports, as well as additional supports may be used without departing from the scope of the invention.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A mobile processing unit, comprising:

an in-feed conveyor generally extending away from a first end of the mobile processing unit, the in-feed conveyor having a lower section and an upper section;

a first in-feed conveyor support coupled to the in-feed conveyor at the lower section and pivotally coupled to a retractable member, the retractable member pivotally coupled to a first frame section extending from the first end of the mobile processing unit, the first in-feed conveyor support configured to support the weight of the lower section of the in-feed conveyor;

a second in-feed conveyor support coupled to the in-feed conveyor at the upper section and pivotally coupled to a second frame section extending from the first end of the mobile processing unit; and wherein the lower section of the in-feed conveyor is adapted to move laterally towards and away from a centerline of the mobile processing unit via actuation of a hydraulic cylinder that controls retraction and extension of the retractable member and a discharge end of the upper section is adapted to move along an arcuate path to maintain a substantially constant address with a crusher in-feed.

2. The mobile processing unit of claim 1, wherein the first and second in-feed conveyor supports are yokes, at least one of which is adapted to pivotally couple to the in-feed conveyor about a horizontal pivot point.

3. The mobile processing unit of claim 1, wherein the retractable member includes a telescoping arm adapted to engage a receiver, and wherein the receiver is pivotally coupled to the first frame section.

4. The mobile processing unit of claim 1, wherein the second frame section includes an upper frame section having at least three different upper pivot points corresponding to a right-hand processing configuration, a center processing configuration, and a left-hand processing configuration, respectively.

5. The mobile processing unit of claim 4, wherein the first frame section includes at least two frame connection points adapted to allow the retractable member to pivotally couple to the first frame section.

6. The mobile processing unit of claim 1, wherein the upper frame section includes a floating upper pivot adapted to allow the second support to pivot with respect to a vertical axis and to also move laterally along an arcuate path.

7. The mobile processing unit of claim 6, wherein the retractable member is pivotally coupled to the first frame section at a center location, such that the lower section may move from a right-hand configuration to a left-hand configuration without moving pivot points.

8. The mobile processing unit of claim 1, wherein the in-feed conveyor is laterally offset from the centerline, and further comprising a discharge conveyor generally extending away from the first end of the mobile processing unit on a common side as the in-feed conveyor and generally along the centerline.

9. The mobile processing unit of claim 8, wherein the discharge conveyor has an outer portion pivotally coupled to an inner portion, the outer portion adapted to move vertically with respect to the inner portion.

10. The mobile processing unit of claim 1, wherein the in-feed conveyor is positioned generally along the centerline, and further comprising a discharge conveyor generally extending away from an opposite second end of the mobile processing unit generally along the centerline.

11. The mobile processing unit of claim 1, wherein the lower section is also adapted for vertical movement with respect to the retractable arm member.

12. The mobile processing unit of claim 11, wherein the vertical movement may be caused by actuation of a hydraulic cylinder coupled between the retractable member and the first support.

13. The mobile processing unit of claim 1, wherein the upper section further comprises a head section that is vertically pivotable about a horizontal pivot point.

14. A mobile processing unit, comprising:

an in-feed conveyor generally extending away from a first end of the mobile processing unit, the in-feed conveyor having a lower section and an upper section;

a first in-feed conveyor support coupled to the lower section of the in-feed conveyor and pivotally coupled to a retractable member, the retractable member pivotally coupled to a first frame section extending from the first end of the mobile processing unit;

a second in-feed conveyor support coupled to the upper section of the in-feed conveyor and pivotally coupled to a second frame section extending from the first end of the mobile processing unit; and wherein the first and second in-feed conveyor supports are configured to allow the in-feed conveyor to swing laterally independent of a discharge conveyor coupled to the first end of the mobile processing unit, wherein the second frame section includes a floating pivot adapted to allow the second in-feed conveyor support to pivot with respect to a vertical axis and also to move laterally along an arcuate path.

15. The mobile processing unit of claim 14, wherein the lower section of the in-feed conveyor is adapted for vertical movement with respect to the retractable member.

16. The mobile processing unit of claim 14, wherein the discharge conveyor is adapted to extend away from the first end of the mobile processing unit on a common side as the in-feed conveyor and generally along the centerline.

17. The mobile processing unit of claim 14, wherein the lower section and/or the upper section of the in-feed conveyor is moved laterally via actuation of a hydraulic cylinder.

18. The mobile processing unit of claim 14, wherein the discharge conveyor is adapted to extend away from the first end of the mobile processing unit on a different side than the in-feed conveyor and generally along the centerline.

19. The mobile processing unit of claim 14, wherein the in-feed conveyor is adapted to move laterally while remaining substantially parallel to a centerline of the mobile processing unit.

* * * * *